United States Patent Office 3,109,730
Patented Nov. 5, 1963

3,109,730
DUCTILE URANIUM FUEL FOR NUCLEAR
REACTORS AND METHOD OF MAKING
Sylvester T. Zegler, Park Forest, Ill., assignor to the
United States of America as represented by the United
States Atomic Energy Commission
No Drawing. Filed Sept. 19, 1961, Ser. No. 139,314
9 Claims. (Cl. 75—84.1)

This invention deals with a process of conditioning partly spent fuel elements of nuclear reactors, and in particular with the conditioning of neutron-irradiated fuel elements that are enriched in fissionable uranium, so that they can be refabricated and used anew in reactors.

Some of the nuclear reactors use $U^{233}$- and/or $U^{235}$- enriched uranium as fuel. Under the effect of neutron-irradiation, fission products are formed in the fuel material which are a "poison" on account of their high neutron-capture cross section and stop or inhibit the chain reaction. The fission products therefore have to be removed from time to time. Furthermore, the fuel, which mostly is used in the shape of preformed bodies or elements, disintegrates to a certain degree, and this requires refabrication.

Some of the fission products encountered in the fuel elements described above are zirconium, ruthenium and molybdenum; the zirconium usually combines with the ruthenium forming a zirconium-ruthenium compound; this compound was found to cause brittleness of the material so that fabrication becomes impractical or even impossible.

Enriched uranium-containing fuel has been processed heretofore for regeneration by so-called slagging, in which mainly the lanthanide and alkaline earth metal fission products are removed, followed by carbide liquation or drossing in which the zirconium is removed. The slagging step consists of melting the fuel in contact with an oxidizing material, for instance in a crucible of alumina, uranium dioxide, thorium oxide, magnesium oxide, or beryllium oxide; a great part of the fission products, such as lanthanide rare earths and alkaline earth metals, are oxidized, and the oxides formed float on the melted mass as a scum, which can be removed easily by mechanical means. This lagging process is patented to Harold M. Feder et al. in the assignee's U.S. Patent No. 2,822,260, granted on February 4, 1958. The melted product, after the scum has been removed, is usually a uranium alloy which contains an average total of 5% of remaining fission products. These remaining fission products are often called "fissium." The fissium-containing uranium contains about 2.5% by weight of zirconium, and the other 2.5% are mainly molybdenum, niobium and noble fission products, such as ruthenium, rhodium and palladium.

Ruthenium favorably affects the ductility of the fissium-containing uranium metal, which is a desirable feature for fabrication; however, the zirconium present ties up the ruthenium in the form of a brittle zirconium-ruthenium compound, ZrRu, and thereby abolishes the beneficial effect of the ruthenium; the ZrRu has a CsCl-type structure. The result of this compound formation is a hard and brittle metal. Also, the zirconium-ruthenium compound makes the workable, ductile, gamma phase of uranium unstable, which again is disadvantageous for fabrication.

The composition of the average fissium-containing uranium, after slagging and scum removal, is as follows: 2.6 wt. percent of zirconium, 1.9% of molybdenum, 1.8% of ruthenium, 0.18% of rhodium, 0.13% of palladium, 0.01% of niobium, and the balance, about 93.4%, uranium.

As mentioned before, in order to remove the zirconium from the fuel, a so-called carbide liquation or drossing step can be applied, which consists in the addition of carbon powder to the molten fissium-containing metal. The carbon reacts with the zirconium to form a zirconium carbide; this zirconium carbide, which then floats to the surface of the metal, can be removed simply by mechanical means. The liquating step, however, has a great drawback in that the carbide formation is very slow.

It is an object of this invention to provide a process for the treatment of slagged fissium-containing uranium that does not require the liquation step so that it can be carried out in a comparatively short time.

It is another object of this invention to provide a process for the treatment of slagged fissium-containing uranium that is simple and can be carried out easily by remote control.

It is finally an object of this invention to provide a process for the treatment of slagged fissium-containing uranium that is comparatively inexpensive.

It has been found that when certain metals, namely aluminum, silicon, titanium or yttrium, are added to the scummed fissium-containing uranium and the metal is cast, a ductile workable metal is obtained so that a further treatment with carbon powder for zirconium removal is not necessary; from observations made on the alloys containing aluminum, silicon and yttrium, it appears that this increase of ductility is due to a suppression of the formation of the undesirable zirconium-ruthenium compound. At the same time, the addition of these metals in many instances brings about stabilization of the workable gamma phase of uranium. The quantity to be added of these metals ranges preferably between 0.25 and 1.0% by weight for silicon and aluminum and from 0.25 to 2.0% for yttrium and titanium.

The invention thus comprises melting the neutron-irradiated fission-products-containing uranium in contact with an oxidizing material according to the above-identified U.S. Patent No. 2,822,260, whereby lanthanide rare earths and alkaline earth metals are oxidized and brought to the surface of the molten metal in the form of oxides; removing the metal oxides from the surface; adding from 0.25 to 1.0% by weight of aluminum or silicon or from 0.25 to 2.0% of titanium or yttrium as a "ductilizing metal" to the molten metal; and cooling the molten alloy to room temperature. A quantity of about 0.5% by weight was found best in all four instances.

The alloys of this invention can be made by any method known to those skilled in the art. The alloys used for the studies that led to this invention were prepared, for instance, by first making a master alloy corresponding approximately to the composition of the fissium-containing uranium as it is given above; this master alloy was prepared by vacuum-induction-melting of the metals and casting. Thereafter the ductilizing metal was added according to this invention in the quantity desired, and the mixture was arc-melted and subsequently cast on a water-cooled copper hearth using an inert atmosphere, for instance of an argon-helium mixture.

Specimens were cut off from the cast buttons for hardness-testing; the hardness was determined in Vickers hardness numbers (VHN). The results are summarized in the table below.

| Alloy | Ductilizer added, w/o | Hardness, VHN |
|---|---|---|
| Master alloy [1] | | 375 |
| | 0.25 Si | 233 |
| | 0.50 Si | 233 |
| | 0.75 Si | 245 |
| | 1.00 Si | 309 |
| | 2.00 Si | 572 |
| | 0.25 Ti | 270 |
| | 0.50 Ti | 258 |
| | 0.75 Ti | 287 |
| | 1.00 Ti | 276 |
| | 2.00 Ti | 342 |
| | 0.25 Al | 243 |
| | 0.50 Al | 249 |
| | 0.75 Al | 256 |
| | 1.00 Al | 297 |
| | 2.00 Al | 425-437 |
| | 0.25 Y | 238 |
| | 0.50 Y | 233 |
| | 0.75 Y | 236 |
| | 1.00 Y | 235 |
| | 2.00 Y | 233 |

[1] Composition given in column 2, lines 3-8.

It will be understood that this invention is not to be limited to the details given herein but that it may be modified within the scope of the appended claims.

What is claimed is:

1. An alloy consisting essentially of uranium, fissium and from 0.25 to 1.0% by weight of a ductilizer selected from the group consisting of silicon, titanium, aluminum and yttrium.
2. An alloy consisting essentially of uranium, fissium and 0.5% by weight of silicon.
3. An alloy consisting essentially of uranium, fissium and 0.5% by weight of titanium.
4. An alloy consisting essentially of uranium, fissium and 2% by weight of titanium.
5. An alloy consisting essentially of uranium, fissium and 0.25% by weight of aluminum.
6. An alloy consisting essentially of uranium, fissium and 0.5% by weight of aluminum.
7. An alloy consisting essentially of uranium, fissium and 0.5% by weight of yttrium.
8. An alloy consisting essentially of uranium, fissium and 2.0% by weight of yttrium.
9. A process of ductilizing a uranium-fissium alloy containing zirconium and ruthenium, comprising melting the alloy; adding from 0.25 to 1.0% by weight of a ductilizing metal selected from the group consisting of silicon, titanium, aluminum and yttrium to the molten alloy; and cooling the molten alloy thus obtained to room temperature.

References Cited in the file of this patent
UNITED STATES PATENTS

| 2,822,260 | Feder et al. | Feb. 4, 1958 |
| 2,919,186 | Colbeck | Dec. 29, 1959 |
| 2,963,361 | Teitel | Dec. 6, 1960 |
| 2,990,274 | Greenberg | June 27, 1961 |

FOREIGN PATENTS

| 821,639 | Great Britain | Oct. 14, 1959 |

OTHER REFERENCES

AEC Report, BMI 1300, September 1959, p. 75.